No. 791,288. PATENTED MAY 30, 1905.
C. PROUTY.
METAL WORKING MACHINE.
APPLICATION FILED APR. 25, 1899.
4 SHEETS—SHEET 1.
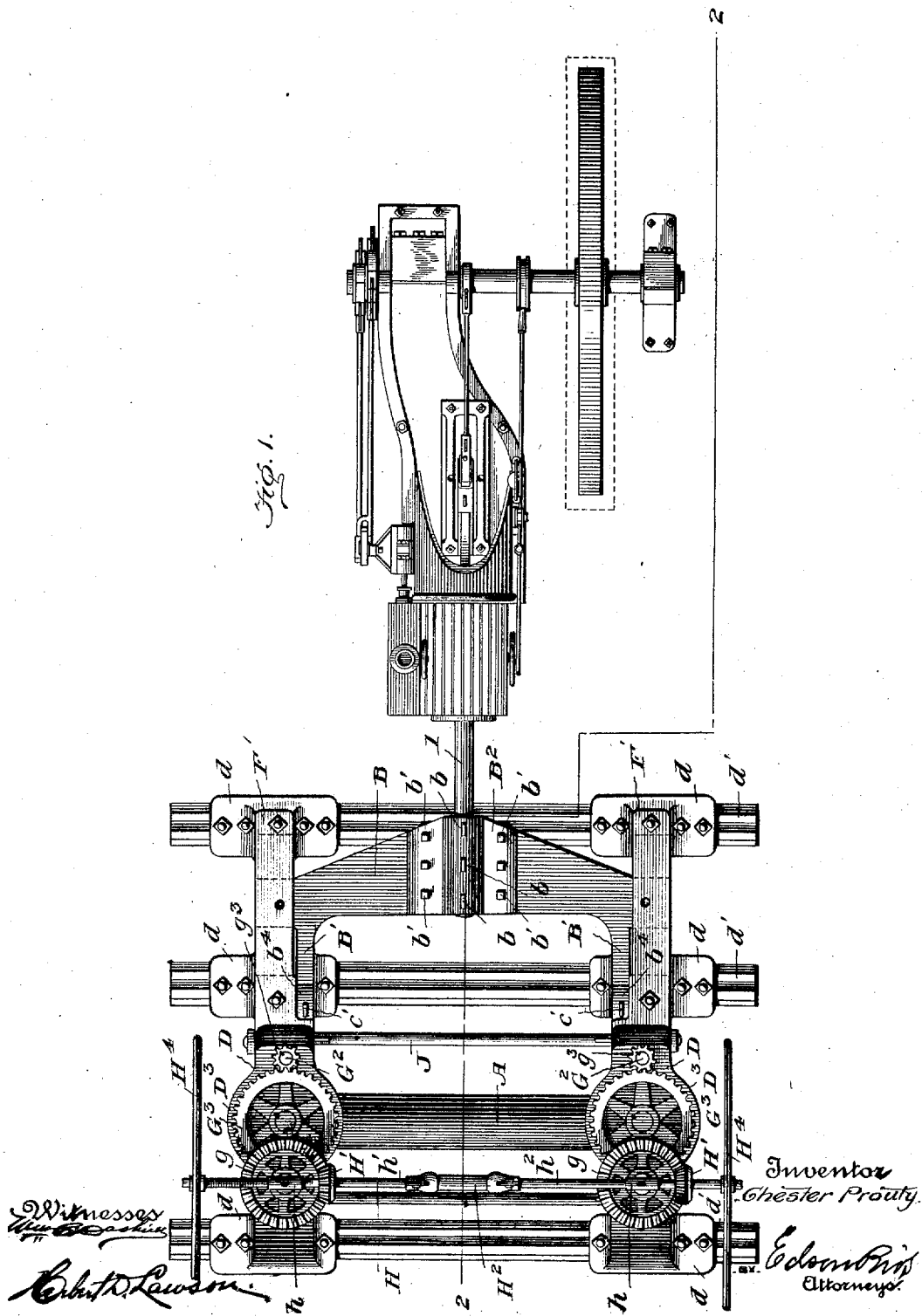

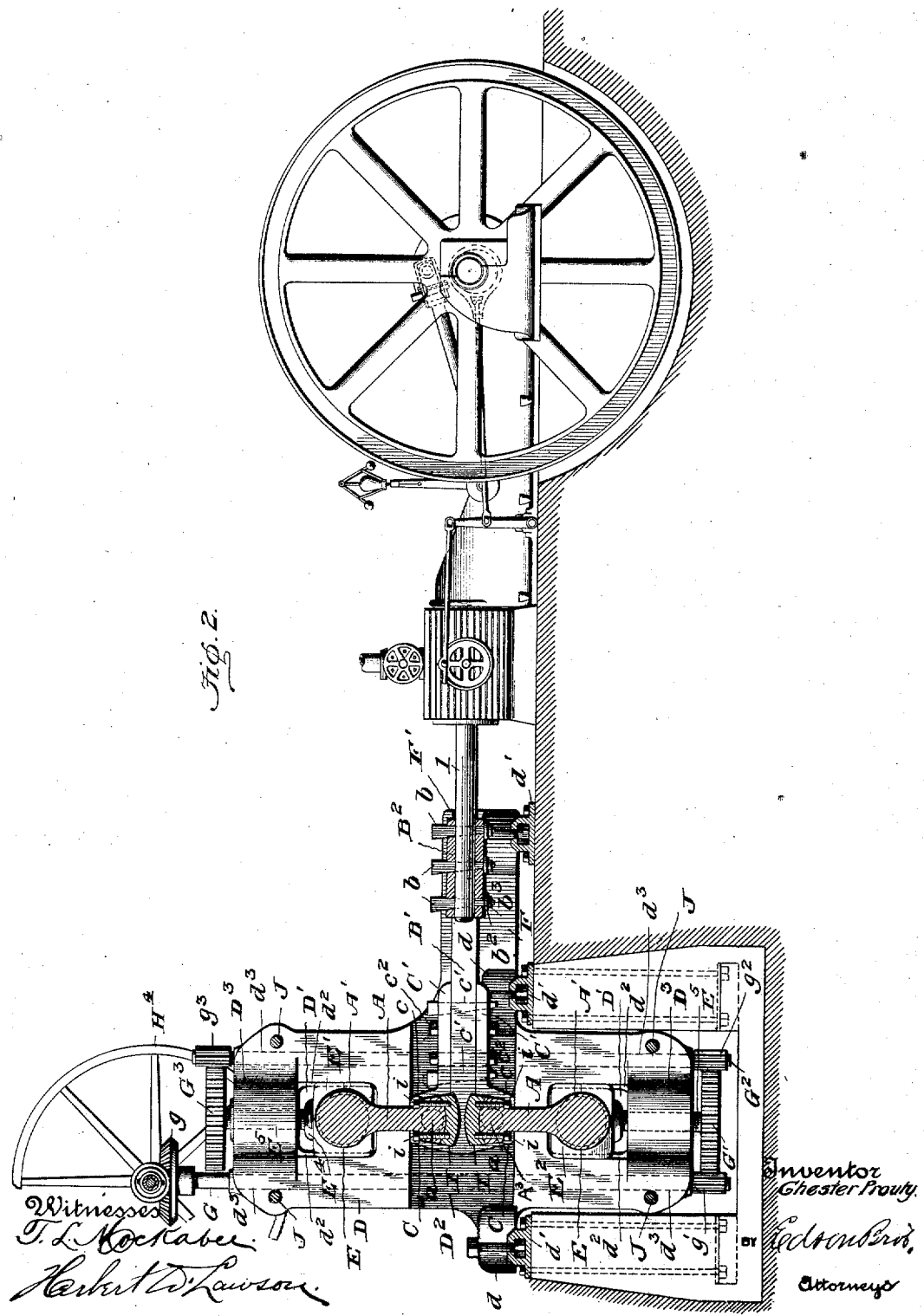

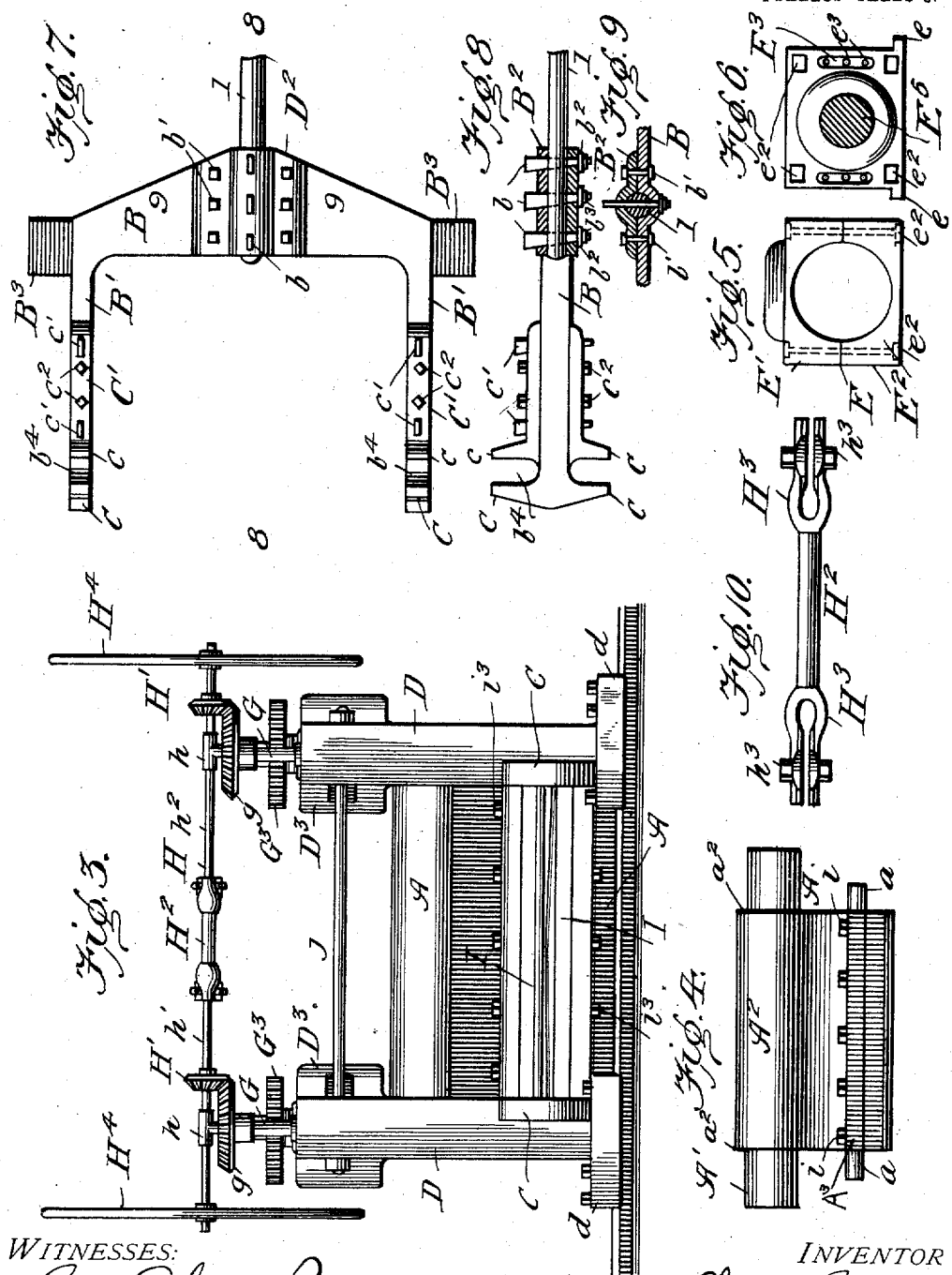

No. 791,288. PATENTED MAY 30, 1905.
C. PROUTY.
METAL WORKING MACHINE.
APPLICATION FILED APR. 25, 1899.
4 SHEETS—SHEET 4.
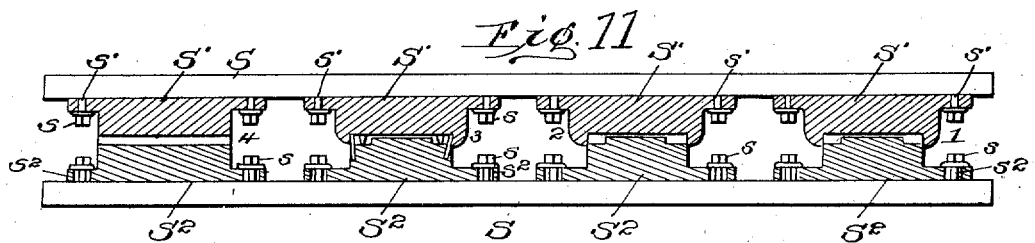
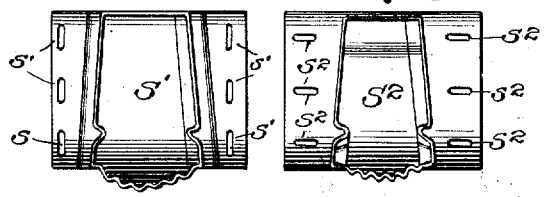
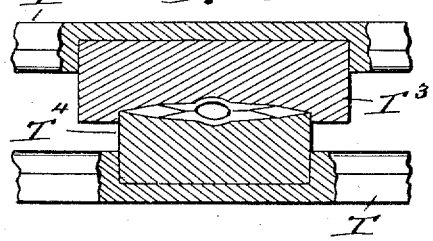
Witnesses
J. M. Fowler Jr.
E. M. Lawson.
Inventor
Chester Prouty.
By Herbert D. Lawson.
Attorney No. 791,288. Patented May 30, 1905.

UNITED STATES PATENT OFFICE.

CHESTER PROUTY, OF RIDGWAY, PENNSYLVANIA.

METAL-WORKING MACHINE.

SPECIFICATION forming part of Letters Patent No. 791,288, dated May 30, 1905.

Application filed April 25, 1899. Serial No. 714,409.

*To all whom it may concern:*

Be it known that I, CHESTER PROUTY, a citizen of the United States, residing at Ridgway, in the county of Elk and State of Pennsylvania, have invented certain new and useful Improvements in Metal-Working Machines; and I do hereby declare the following to be a full, clear, and exact description of the invention, such as will enable others skilled in the art to which it appertains to make and use the same.

My present invention relates to an improvement in metal-working machines; and its objects are to provide a machine with die-holders having suitable limited oscillating movement adapted to overcome the disadvantages incident to the use of rolls in shaping, working, and finishing such metal articles as can be worked in this machine; to produce a machine having true working bearings, whereby perfect lateral and longitudinal adjustment of all its parts may be secured and whereby a true motion in the pass or passes thereof is secured; to produce a machine which will roll different kinds of plates, &c., with the grain thereof transverse of the metal and in a line with the pass; to provide solid housings which are cored out to receive part of mechanism for adjusting the top and bottom die-holders, and to provide a machine having detachable dies.

In the manufacture of saws I have discovered that it is advantageous to throw the grain of the steel longitudinally with the teeth instead of transversely thereof, as heretofore. By providing a machine of the construction herein shown and described a saw, &c., can be rolled from edge to edge—to wit, transversely, instead of longitudinally—and therefore a saw will be produced with teeth which can be set and bent to the desired shape without breaking, and therefore another object of my invention is to provide a machine capable of producing tools, &c., having the grain thereof at an angle to the working edge.

A further object is to provide a machine which will form saws or other desired tools, &c., having a refined crust on each side when in their finished condition, which crust enables the tool to hold a sharp keen tough edge and to readily cut through hard substances.

With these objects in view the invention consists in the novel constructions and combinations of parts hereinafter more fully described and claimed, and illustrated in the accompanying drawings, showing the preferred embodiment of my invention, and in which—

Figure 1 is a top plan view of a large machine in position to be driven by an engine. Fig. 2 is a section on line 2 2, Fig. 1. Fig. 3 is a front elevation thereof. Fig. 4 is an elevation of a die-holder and a die-plate secured thereto, detached. Fig. 5 is an elevation of the bearing-box for the necks of the die-holders. Fig. 6 is a top plan view thereof. Fig. 7 is a plan view of the cross-head of the large machine. Fig. 8 is a central longitudinal section through the cross-head shown in Fig. 7. Fig. 9 is a transverse section through a portion of the cross-head and the rod connected thereto. Fig. 10 is a detailed view of the connecting-clutch for the horizontal shaft of the adjusting mechanism. Fig. 11 is a section through two die-holders having dies connected thereto. Fig. 12 is a plan view of a detached upper forming-die. Fig. 13 is a similar view of the lower die, and Fig. 14 is a section through dies suitable for welding parts of an ax together and showing an ax therein.

It is well known in metal-working that it is hard to roll a wide plate to an even gage on account of the spring of the rolls, which in many cases would make the plate considerably thinner upon the edges than at its central portion or oval in cross-section. In order to overcome the spring in my machine, I have provided solid die-holders A, preferably of the construction shown and of such length from the pass to the pivotal centers that they will entirely do away with that objectionable feature, thereby enabling the operators to produce articles of exact desired gage both longitudinally and transversely. As an additional means of securing a perfect product from this machine the die-holders A must have positive movement, so that both the top and bottom dies, which are secured to said die-holders, will travel at the same time at the same speed and for the same distance upon their centers. This I secure by preferably employing a cross-head comprising the cross-bar B, the bearing ends B³, and two forwardly-extending arms B', each of which arms is provided with two adjustable bearings $b^4$, adapted to receive the small necks $a$ of the upper and lower die-holders, respectively, said bearing-plates B³ and arms B' working in guides in the cross-head frame and in the housings, respectively, as hereinafter described. The cross-head is attached to an engine preferably by means of tapering keys $b$, fitted in key-seats, as shown, whereby in case of lateral play all slack can be taken up. In order to warrant this connection being solid in its operation, I have placed washers and bolts on the lower ends of the keys. These keys and bolts are inserted through a top plate B², suitably secured to the cross-head. The reason for this construction is to produce a cross-head which can be readily attached to or detached from an engine having a piston-rod 1 extending through the rear end of its cylinder. Said cross-head can be attached by bolting the plate B² securely thereto in alinement with said rearwardly-extending piston 1 and the working bearings of the machine, said plate B², cross-bar B, and piston 1 being key-seated and fastened by keys, as shown, said keys $b$ being driven tightly into said seats and provided with washers $b^2$ and nuts $b^3$, so that all wear and longitudinal play may be readily taken up. In order to disconnect the engine from the machine, it is merely necessary to remove the keys $b$ and their nuts $b^2$ and the bolts $b'$ of the plate B². Said plate is then removed, permitting the cross-head to settle a trifle, thereby offering no obstruction to the movement of the engine, which can then be used to operate other machinery independently and separately from this machine. It is obvious that, if desired, other means may be employed for securing the cross-head to the piston.

To take up the wear that will occur by the movement of the small or driving necks $a$ of the die-holders A in their bearings, I have provided adjustable bearings $b^4$. To form these bearings, the arms B' are each provided with two oppositely-extending and vertical projections C, slidably mounted within guides in the housings. These oppositely-extending projections extend beyond the small or propelling necks $a$ of the die-holders, which necks are held firmly in working position against the said projections C by means of two adjustable plates C', having projections $c$ similar to those on the arms of the cross-head and which are likewise slidably mounted in guides in the housings, and these plates in order to take up the wear upon the necks $a$ of the die-holders that would result from the continual motion of the machine are made adjustable by means of keys $c'$ and bolts $c^2$. This adjustment is necessary in order to keep the necks of the die-holders constantly close and in perfect running condition.

In order to construct suitable housings D for the machine, I preferably cast each side of the housing in one solid piece and with three pairs of bearings $d$ to fit three bed-plates $d'$, as shown, and two slots D', one near each end, the sides of said slots D' countersunk from their inner sides, as at $d^2$, for the reception of the adjustable bearing-boxes E, within which bear the pivot-necks A' of the die-holders A. It will be seen that inward displacement of these boxes E is prevented by the shoulders $a^2$ of the die-holders A, and outward displacement is prevented by flanges $e$, formed on said boxes, as shown in Fig. 6, and resting within the countersunk edges $d^2$ of the slots D' and whereby the inner surfaces of the boxes E and their housings D are flush. These boxes are formed of two parts—an upper section E' and a lower section E²—and said parts are held together by means of, preferably, four bolts $e^2$, as shown. The upper section of the box is provided with cups E³, said cups having holes $e^3$, whereby grease may be transmitted to that part of the necks of the die-holders bearing within the boxes. It also has secured to its upper surface a swivel-plate E⁴, adapted to receive the inner swivel end of the adjusting-screw E⁵, which is suitably mounted in the end of the housing D.

Each of the housings is planed smooth upon its inner surface, which is flush with the bearing-boxes E. The ends of the die-holders A are also planed smooth, and the said housings D and their boxes E form running bearings for the said holders, and thereby prevent end vibrations and insure a perfect motion of the pass.

The central portion of each of the housings is grooved upon its inner surface, said grooves D² adapted to receive and serve as a guide for the small necks $a$ and their bearings $b^4$, which bearings are mounted on the cross-head arms B', as before stated. Said grooves or guides D² are preferably planed smooth and straight to secure a true and perfect sliding motion of the cross-head and must be wide enough to permit the dies to be adjusted closer together or farther apart to suit the different kinds of work to be made. As this guide or groove D² in the housing D would tend to weaken the same, it is necessary for said housing to contain enough metal at that point to prevent any vibration or breakage thereof. This additional strength is secured by either thickening or widening the portion of the housing adjacent to said groove.

Projecting from the central part of the housings D are horizontal portions F, adapted to form the under bearings for the cross-head B, which bearings are preferably planed with a true surface and each provided with a cap F', which is also planed true on its under surface and bolted to the under bearing, as shown, thereby forming a perfect bearing for the ends B³ of the movable cross-head B' to work in.

The housings D between their ends and the [ou]ter ends of the box-receiving slots D' are [m]ade greater in thickness, as shown at D³, so [as] to receive the threaded bronzes or brasses [o]r the adjusting-screws without impairing [th]e strength of the housing at those points. [It] will be understood that the metal in these [ho]usings is so distributed as to reduce weight as [m]uch as possible without impairing required [st]rength at any point within them. Each housing is also formed with two vertical parallel [pa]ssages d³, as shown in dotted lines, Fig. 2. [Th]ese passages d³ are adapted to receive shafts [of] novel adjusting mechanism and protect [th]em from injury. This adjusting mechanism [co]nsists of the main shaft G, provided at its [up]per end with a suitable gear g and passing [th]rough the forward passage in said housing, [it]s lower end provided with a long cog-gear G of small diameter meshing with a large cog-[ge]ar G' on the bottom of the housing, which [is] secured to the adjusting-screw E⁵ of the [lo]wer bearing-box E. This gear G' extends [ov]er and meshes with a second long gear g² [of] small diameter, which is keyed or set to [th]e lower end of a second shaft G², similar to [th]e main shaft G, and which is mounted in [an]d runs through the passage d³ in the back [ed]ge of the housing D and is provided on its [up]per end with another long cog-wheel g³, of [sm]all diameter, which imparts even motion to [a] second large cog G³, which is attached to [th]e upper adjusting-screw E⁵. The opposite [ho]using of the same mill is provided with [si]milar adjusting mechanism.

The adjusting mechanism of the two housings of the mill are preferably connected by [me]ans of a shaft H, mounted near each end [in] a bearing h, swiveled or otherwise suitably [se]cured to the upper ends of the shafts G to [pe]rmit said shafts to rotate without causing [th]e rotation of bearings h. This shaft H is [pr]ovided with suitable pinions H', adapted to [me]sh with the pinion g on the main shaft of [th]e adjusting mechanism in each housing, and [it] is obvious by this arrangement the adjust[me]nts in each housing can be moved together [an]d for the same distance. Motion may be [im]parted to the shaft H in any suitable man[ne]r and the operation of the adjusting mechanism will be obvious. If, however, it is de[sir]ed to adjust a bearing E in one of the housings independently of the bearing E in the [oth]er housing, this can be readily done as [he]reinafter described. The shaft is formed [of] two sections h' h², the ends of which are [in]serted into and held within a double shaft-[ch]uck H² of the peculiar construction shown [in] Fig. 10. Said chuck is preferably formed [of] a cast-steel tube enlarged and slotted at [ea]ch end, as at H³, said ends preferably flared [an]d provided with bolt-holes for the recep[tio]n of bolts h³, as shown, whereby said ends [ar]e adapted to be clamped upon those por[tio]ns of the shaft H inserted therein. When it is necessary to vary the width of the pass or to even it up to do any particular class of work, this can be done by simply loosening the bolts h³ in one end of the shaft-chuck H², so that it will turn freely upon one section of the shaft H. Then the side which it is desired to adjust can be turned by the handwheel H⁴ on its side independently and separately from the other side and by that operation the dies and die-plates can be adjusted in proper relation to the housings and the work.

In manufacturing the die-holders it is necessary in order to overcome spring to make the bodies thereof at least two-thirds longer than their width and at least three times as long as the diameter of the pivot-necks, and the metal must be distributed through the die-holder in proportion to the strength that would be required for the different classes of work performed thereby. It is also necessary to form the rounded outer edge A² larger than the necks in order to give them strength and to hold their bearing-boxes in position, also to afford additional strength to overcome the tendency to spring. As a further means for overcoming the liability of the die-holders A to spring they are preferably made of one solid piece of metal, large and round at the edges opposite to the pass and enlarged at their inner edges A³, to which the dies or die-plates I are secured by means of bolts i or in other desired manner, and preferably reduced in thickness between said edges; but in every case there should be sufficient metal left between the edges to overcome any tendency to vibration in the holders. It is to be understood that the edges of the die-holders are to be made perfectly straight or to fit and work flush with the inner side of the housings and bearing-boxes, thus overcoming end play and the tendency to throw the dies or die-plates out of perfect alinement.

In order to hold the housing against the ends of the die-holders and prevent them from vibrating or spreading, I preferably provide them with four stay-bolts J, although other suitable devices may be substituted therefor. These bolts are passed through holes formed near each corner of the housings.

As before indicated, the die-holders are preferably made with four necks—two large round necks A', projecting from the ends of the large portion A² of the die-holders and to be placed in their adjustable bearing-boxes E, and two small necks a, projecting from the ends of the die-receiving portion a³ of the holder, which small necks are to be made about one-half as long as the large necks A' and are adapted to rest in the bearings b⁴ upon the arms B' of the cross-head B, and the ends thereof bear against the inner surface of the guideways D² in the housings.

The inner edges of the die-holders are enlarged, as at A³, and made suitable to hold the different kinds of dies and die-plates I for the manufacture of different kinds of products. The surface portion to which these dies or die-plates are secured may be varied in cross-section, if necessary; but in all cases it must be made to fit the inner surface of the die or die-holder. In ordinary cases these dies I may be detachably secured to the die-holder A by means of bolts $i$, the heads of which preferably bear upon shoulders $A^3$, formed upon said die-holders, as shown. I prefer to construct all of these machines so that their dies or die-plates I can be quickly removed and replaced without interfering with the remainder of the machine.

As before stated, the housings of the larger machines are provided with three or more bed-plate bearings $d$, which are adapted to rest upon their suitable bed-plates $d'$, whereby the housings D can be moved sidewise for a suitable distance to permit the die-holders A or any portion of the central working part of the machine to be quickly removed for repairs or replacement and to permit the said housings D to be placed in perfect running alinement.

In Fig. 11 I have shown a section of a set of die-plates S and dies thereon suitable for shaping blanks and preventing them from spreading. The dies can be adjusted upon their respective plates S to put them in perfect alinement. This is permitted because one die, S, of each set has slots $s'$, running lengthwise thereof, while the other die, $S^2$, has slots $s^2$ running transversely thereof, as shown in Figs. 12 and 13, respectively. These dies S' and $S^2$ are female and male dies, respectively, and by constructing them as shown in Fig. 14 they will confine metal fed between them and prevent it from spreading during the shaping operation. By referring to said figure it will be seen that a female die $T^3$ is used in conjunction with a male die $T^4$, which fit snugly together, both dies being fastened to plates T.

Having thus fully described my invention, what I claim as new, and desire to secure by Letters Patent, is—

1. In a metal-working machine, the combination with housings, of a solid die-holder having a neck extending from each end near one edge, said necks being journaled within the housings, propelling-necks at each end of the holder near its opposite edge, a cross-head adapted to reciprocate between the housings, oppositely-extending projections upon the cross-head and adjustable plates for clamping the propelling-necks against the projections.

2. In a metal-rolling machine, the combination with the housings having grooved inner faces; of solid die-holders, pivot-necks extending from the ends thereof at one edge and bearing in the housings, propelling-necks extending from the ends of each holder near its opposite edge, a cross-head the sides of which bear in the grooves of the housings, oppositely-extending projections at each side of the cross-head, adjustable plates for clamping the propelling-necks to the projections, and means for reciprocating the cross-head.

3. In a metal-rolling machine, the combination with die-holders; of a reciprocating cross-head, propelling-necks to the die-holders engaging opposite sides of the cross-head and movable vertically therein and means for adjusting the holders toward or away from each other without shifting the center of the pass formed between them or removing the propelling-necks from engagement with the cross-head.

4. In a machine for working metal, pivoted, oscillating, and adjustable die-holders, each formed of a solid piece of metal, necks upon the edges of said die-holders near the pass formed thereby and a cross-head having horizontally-movable arms pivoted to said necks as described, for moving said holders synchronously in the same direction, substantially as described.

5. In a machine for working metal, the combination of pivotally-mounted oppositely-extending die-holders, dies secured to the inner or adjacent ends of said holders, necks projecting laterally from said holders, near the inner die-supporting ends thereof, and a reciprocating power device having arms, movable in a horizontal plane engaging said necks, substantially as described.

6. In a machine for working metal, oscillating die-holders, and necks on said holders, near the pass formed thereby, and a cross-head forming a bearing for the necks and adapted to impart motion thereto, the necks being vertically movable in the cross-head.

7. In a machine for working metal, the housings provided with slots for the reception of suitable boxes, the edges of said slots countersunk, and each housing having a horizontal groove or guide in its inner surface, and a cross-head adapted to be received, supported and guided in the grooves.

8. In a machine for working metal, the slotted housings each provided with a horizontal groove or guide, and a horizontally-extending portion in alinement with said horizontal groove, said groove and extension supporting and guiding a cross-head, substantially as described.

9. In a machine for working metal, a housing cored near each edge, slotted near each end, thickened between said slots and ends having a horizontal groove or guide on one surface at a point intermediate its length and provided with a horizontally-projecting portion adjacent to said groove, all for the purpose, and substantially as described.

10. In a machine for working metal, housings each provided with an outwardly-extend ing portion intermediate its length and having a groove in its inner surface, die-holders pivotally connected to the housings and having necks projecting into and movable within said grooves, and means, slidably mounted in said groove and said outwardly-extending portion, whereby motion is imparted to die-holders, substantially as described.

11. In a machine for working metal, the combination, with the housings each having an outwardly-extending portion, a pair of pivotally-mounted die-holders, each having a propelling-neck, a cross-head comprising a cross-bar, the ends thereof bearing upon the outwardly-extending portion, horizontally-projecting arms to said cross-bar, and oppositely-extending projections, on each of said arms, slidably mounted in a groove in each housing and forming bearings for the propelling-necks of the die-holders, substantially as described.

12. In a machine for working metal, the combination with the grooved housings, of a pair of pivotally-mounted die-holders, each having a propelling-neck, a cross-head, said cross-head comprising the cross-bar, the bearing ends thereof, horizontally-projecting arms, and oppositely-extending projections on each of said arms slidably mounted in the grooves in the housings and forming bearings for the propelling-necks of the die-holders, and means for taking up wear upon said projections and propelling-necks, substantially as described.

13. In a machine for working metal, the combination with a pair of pivotally-mounted die-holders, each having a propelling-neck, of a cross-head comprising the cross-bar, the bearing ends thereof, the horizontally-projecting arms, oppositely-extending projections at the end of each of said arms, plates adjustably secured to said arms, and similar projections formed on said plates, said arm and plate projections forming bearings for the propelling-necks of the die-holders, substantially as described.

14. In a machine for working metal, the housings, each having a guide or groove on the inner surface thereof, oscillating die-holders mounted between said housings, propelling-necks near the inner end of each of said die-holders and projecting into said grooves, a cross-head slidably mounted upon a portion of each housing, arms projecting from said cross-head and bearing in said guides or grooves, and projections at the end of each of said arms adapted to bear upon said propelling-necks of the die-holders, substantially as described.

15. In a machine for working metal, the housings having slots therein provided with countersunk edges; bearing-boxes mounted in said slots and having flanges resting within said countersinks; die-holders having necks bearing in said boxes; and means for imparting motion to said die-holders synchronously and in the same direction, said die-holders bearing in working relation against the inner surface of each of the housings and the boxes, substantially as described.

16. In a machine for working metal, the housings having slots therein provided with countersunk edges; bearing-boxes mounted in said slots and having flanges resting within said countersinks; die-holders having supporting-necks bearing in said boxes and propelling-necks near their inner ends; a groove or guide formed in the inner surface of each housing and adapted to receive said propelling-necks; and means for imparting motion to the said propelling-necks synchronously and in the same direction, the ends of said necks and of the die-holders bearing in working relation against the inner surface of the slots or guides and the inner surfaces of the housings and boxes, respectively, substantially as described.

17. In a machine for working metal, the housings each having slots therein provided with countersunk edges on the inner side of said housing; bearing-boxes slidably mounted in said slots; flanges on said boxes resting within said countersunk edges and flush with the surface of the housing, whereby outward displacement of said boxes is prevented; die-holders pivotally mounted in said boxes, said holders bearing against the inner surfaces of the boxes and housings; propelling-necks near the inner ends of the holders, and means for imparting direct motion to said necks, substantially as described.

18. In a machine for working metal, the combination with the housings and the bearing-boxes mounted therein, of means, for adjusting said boxes, comprising a shaft mounted in one edge of each of said housings, a pinion at the lower end thereof, a second pinion meshing therewith and attached to an adjusting-screw secured to the lower bearing-box, a third pinion mounted upon a second shaft, passing through the opposite edge of the housing and meshing with said second pinion, and a fourth pinion secured to the upper end of the second shaft and meshing with a pinion secured to an adjusting-screw secured to the upper bearing-box, of a section of a shaft, extending from the adjusting mechanism of each housing, and a detachable clutch rigidly connecting said shaft-sections, for the purpose described.

19. In a machine for working metal, the housings, die-holders pivoted therebetween, die-plates secured to said die-holders, a set of dies secured to said plates, one die of said set slotted longitudinally, and the other die slotted transversely, whereby said dies may be adjusted to the desired relation to each other, and bolts passing through said slots whereby said dies may be firmly clamped or secured in proper position, substantially as described.

20. In a machine for working metal, the combination with housings; of an upper and a lower die-holder pivoted therebetween, a male die secured to one of the holders, a female die secured to the remaining holder, and adapted to receive the male die and confine metal fed therebetween, against lateral spreading, and a horizontally-movable cross-head engaging the holders and adapted to oscillate the same in unison.

In testimony whereof I affix my signature in presence of two witnesses.

CHESTER PROUTY.

Witnesses:
L. J. CORBITT,
F. W. McFARLIN.